United States Patent [19]

Furubayashi et al.

[11] Patent Number: 4,649,365
[45] Date of Patent: Mar. 10, 1987

[54] PLATINUM RESISTOR FOR THE MEASUREMENT OF TEMPERATURES

[75] Inventors: Hisatoshi Furubayashi, Yamatokoriyama; Hiroki Tabuchi, Nara; Masaya Hijikigawa, Yamatokoriyama, all of Japan

[73] Assignee: Sharp Kabushiki Kaisha, Japan

[21] Appl. No.: 825,865

[22] Filed: Feb. 4, 1986

[30] Foreign Application Priority Data

Feb. 6, 1985 [JP] Japan .................. 60-22540

[51] Int. Cl.⁴ .............................. H01C 3/04
[52] U.S. Cl. ................... 338/25; 338/225 D; 338/314; 219/501
[58] Field of Search ............... 338/34, 35, 25, 22 R, 338/225 D, 308, 314; 219/501

[56] References Cited

U.S. PATENT DOCUMENTS 4,101,605  7/1978  Gergen et al. ............... 260/873
4,277,742  7/1981  Kovac et al. ................ 219/501 X

FOREIGN PATENT DOCUMENTS 2336778   7/1977  France ........................ 338/25
55-125422 9/1980  Japan ......................... 338/25
56-152204 11/1981 Japan ......................... 338/34

OTHER PUBLICATIONS

Honeywell–Prospekt Precision Interchangeable Temperature Sensors TD Series, Jun. 1986.
Bull. ASE/USS, Oct. 1984, Seite 1184–1186.

Primary Examiner—E. A. Goldberg
Assistant Examiner—M. M. Lateef
Attorney, Agent, or Firm—Ciotti & Murashige

[57] ABSTRACT

A platinum resistor for the measurement of temperatures having a silicon substrate, an aluminum oxide film formed on said silicon substrate, and a platinum film formed on said aluminum oxide film.

2 Claims, 4 Drawing Figures

PLATINUM RESISTOR FOR THE MEASUREMENT OF TEMPERATURES

BACKGROUND OF THE INVENTION

1. Field of the Invention

This invention relates to a platinum resistor for the measurement of temperatures, which functions as a temperature sensor.

2. Description of the Prior Art

Platinum is chemically stable and can be readily obtained with a high degree of purity. Moreover, the electrical resistance of platinum is greatly dependent upon temperatures. Thus, platinum has long been used as a material for temperature sensors, which is composed of an extremely thin platinum wire spirally wound around a mica insulator and a protective tube containing the said thin platinum wire therein. These temperature sensors are widely used as a resistor for the measurement of temperatures, the detailed specifications of which are given in Japanese Industrial Standard (JIS) C-1604, DIN 43760 and IEC Pub 751. This resistor for the measurement of temperatures is extremely accurate, but it contains such defects that:
(1) the mechanical strength is poor,
(2) the production is time-consuming,
(3) the product is large, and
(4) the product is expensive.

In order to eliminate these defects, resistors for the measurement of temperature using platinum in a thick or thin layer have been developed in recent years, and some are commercially available. However, the resistors for the measurement of temperatures including thick platinum layers are produced by a screen printing technique, causing problems in that the formation of a fine pattern of 100 $\mu$m or less is difficult and that quality control during production is difficult to maintain.

On the other hand, the resistors for the measurement of temperatures including thin platinum layers have such advantages that:
(1) a fine pattern is readily achieved, which makes possible miniaturization and high resistibility, so that an increase in sensitivity of the devices can be attained,
(2) the mechanical strength is great, and
(3) as these devices are produced in a wafer, quality control during production can be maintained and mass production becomes possible, so that the production cost can be reduced.

The production process for resistors for the measurement of temperatures made using thin platinum layers is as follows: A thin platinum layer having a thickness of several thousands of angstroms is, first, attached to an insulating substrate by a vacuum evaporation method, sputtering, etc. The thin platinum layer is then finely patterned by a wet etching technique, a sputter etching technique, etc., followed by heating at a temperature of 800°–1400° C. in air. Then, trimming is carried out to adjust resistance, and the resulting product is cut into chips, to each of which lead wires are then connected, resulting in a resistor for the measurement of temperatures including a thin platinum layer. The insulating substrate is, for example, alumina, sapphire, silicon, or glass, each of which has the following advantages and drawbacks:

An alumina substrate is inexpensive and is excellent in the thermal resistance, and moreover has an excellent adhesion to platinum, but it is inferior in that problems arise with the formation of fine patterns due to the roughness of the surface thereof. If the surface is polished, it becomes smooth. However, polishing of an alumina substrate, which is hard, greatly raises the cost of the substrate. A sapphire substrate is excellent in thermal resistance, the adhesion to platinum and the smoothness of the surface, but it is inferior in that this substrate is most expensive and the operation of cutting it into minute chips is difficult. A silicon substrate is relatively inexpensive and smoothness of the surface thereof is excellent, and it is easy to be processed. However, when it is heat-treated, an alloy of the silicon and the platinum is formed, which affects the sensor characteristics thereof. A glass substrate is inexpensive, but presents problems such as having a poor adhesion to platinum and having no thermal resistance. Thus, all four of these substrates have disadvantages as well as advantages, and there is still a need for a better substrate.

SUMMARY OF THE INVENTION

The platinum resistor for the measurement of temperatures of this invention which overcomes the above-discussed and numerous other disadvantages and deficiencies of the prior art, comprises a silicon substrate, an aluminum oxide film formed on said silicon substrate, and a platinum film formed on said aluminum oxide film.

The aluminum oxide film is, in a preferred embodiment, formed on said silicon substrate by a vacuum evaporation method, sputtering, ion-plating, chemical vapor deposition, or an anodic oxidation method.

Thus, the invention described herein makes possible the objects of (1) providing a platinum resistor for the measurement of temperatures which is inexpensive since a silicon substrate is used; (2) providing a platinum resistor for the measurement of temperatures which is excellent in thermal resistance since it is made using a silicon substrate and an aluminum oxide film; (3) providing a platinum resistor for the measurement of temperatures which has a platinum film on an aluminum oxide film covering a silicon substrate therewith, so that the formation of an alloy of the platinum and the silicon can be avoided and also the adhesion of the silicon substrate to the platinum can be excellent; (4) providing a platinum resistor for the measurement of temperatures in which a platinum film is formed on a silicon substrate with a smooth surface through an aluminum oxide film and the surface of the platinum film becomes smooth, so that a fine pattern can be formed on the platinum film; and (5) providing a platinum resistor for the measurement of temperatures in which the substrate is made of silicon so that it is readily cut into chips.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The platinum resistor for the measurement of temperatures of this invention is characterized in that an aluminum oxide film is formed on a silicon substrate, and a platinum film is formed on the said aluminum oxide film.

This invention was completed based on knowledge of the inventors that (1) either an alumina substrate or a sapphire substrate is excellent in the adhesion to a thin platinum film and an alloy is not formed therebetween; (2) a silicon substrate is relatively inexpensive, excellent in smoothness and moreover easy to be processed; (3) any of the above-mentioned substrates has a sufficient thermal-resistance; and (4) thus, by the adhesion of an aluminum oxide film to a silicon substrate, the above-mentioned disadvantages and the deficiencies of the prior art will be able to be solved.

The platinum resistor for the measurement of temperatures of this invention includes not only a thin platinum film but also a thick platinum film. The method for the formation of an aluminum oxide film on a silicon substrate is, for example, a vacuum evaporation method, sputtering, ion-plating, chemical vapor deposition, an anodic oxidation method, etc. In order to minimize contamination by impurities, a vacuum evaporation method, sputtering or ion-plating is preferably used.

EXAMPLE

Figure 1:
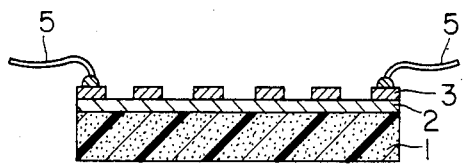
FIG. 1 is a sectional front view showing a platinum resistor for the measurement of temperatures of this invention.

FIG. 1 shows a platinum resistor for the measurement of temperatures of this invention, which comprises a silicon substrate 1, an aluminum oxide film 2 formed on the silicon substrate 1, a platinum film 3 with a pattern formed on the aluminum oxide film 2, and lead wires 5 connected to the platinum film 3.

Figure 2:
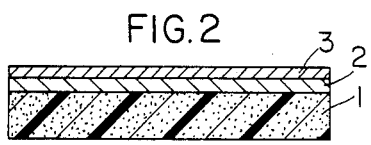
FIGS. 2 to 4 are sectional front views showing the production process of the resistor shown in FIG. 1.
Figure 3:
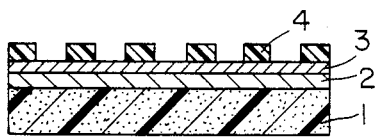
Figure 4:
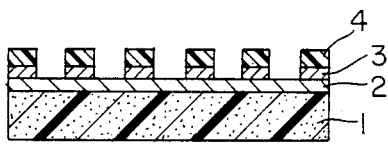

This platinum resistor is produced as follows: On the silicon substrate 1, the aluminum oxide film 2 having a thickness of several thousands of angstroms to several microns is formed by sputtering or ion-plating, followed by the adhesion of the platinum film 3 having a thickness of several thousands of angstroms to several microns by sputtering or the like (FIG. 2). Then, a photoresist pattern 4 is formed on the platinum film 3 (FIG. 3), which is then patterned according to the pattern of the photoresist 4 by a sputter-etching technique (FIG. 4). The photoresist 4 is then removed. The product is heated at a high temperature of around 1000° C. in air and trimmed to adjust resistance. The lead wires 5 are finally connected to the platinum film 3 by welding, resulting in a platinum resistor for the measurement of temperatures.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. A platinum resistor for the measurement of temperatures comprising a silicon substrate, an aluminum oxide film formed on said silicon substrate, and a platinum film formed on said aluminum oxide film.

2. A platinum resistor for the measurement of temperatures according to claim 1, wherein said aluminum oxide film is formed on said silicon substrate by a vacuum evaporation method, sputtering, ion-plating, chemical vapor deposition, or an anodic oxidation method.

* * * * *